United States Patent
Boire et al.

[11] Patent Number: 5,939,201
[45] Date of Patent: Aug. 17, 1999

[54] METHOD FOR DEPOSITING A REFLECTIVE LAYER ON GLASS, AND PRODUCTS OBTAINED

[75] Inventors: Philippe Boire; Laurent Joret, both of Paris, France

[73] Assignee: Saint-Gobain Vitrage, Courbevoie, France

[21] Appl. No.: 08/945,757

[22] PCT Filed: Mar. 6, 1997

[86] PCT No.: PCT/FR97/00394

§ 371 Date: Feb. 3, 1998

§ 102(e) Date: Feb. 3, 1998

[87] PCT Pub. No.: WO97/32823

PCT Pub. Date: Sep. 12, 1997

[30] Foreign Application Priority Data

Aug. 7, 1996 [FR] France .................................. 96/09945

[51] Int. Cl.$^6$ .............................. B32B 15/00; B32B 17/06
[52] U.S. Cl. ............................ 428/432; 65/60.2; 65/60.5; 65/60.8; 359/839; 359/900; 427/165; 427/166; 427/167; 427/255.7; 427/419.2; 427/419.3; 428/702
[58] Field of Search ..................... 65/60.2, 60.5, 65/60.8, 95, 97; 427/166, 165, 167, 255.7, 419.2, 419.3; 359/839, 900; 428/432, 702

[56] References Cited

U.S. PATENT DOCUMENTS

| | | | |
|---|---|---|---|
| 4,056,650 | 9/1977 | Dates et al. | |
| 5,580,364 | 12/1996 | Goodman et al. | 427/166 X |

FOREIGN PATENT DOCUMENTS

| | | |
|---|---|---|
| 0 030 792 | 6/1981 | European Pat. Off. |
| 0 176 935 | 4/1986 | European Pat. Off. |
| 0 177 834 | 4/1986 | European Pat. Off. |
| 0 363 747 | 4/1990 | European Pat. Off. |
| 0 386 993 | 9/1990 | European Pat. Off. |
| 0 479 678 | 4/1992 | European Pat. Off. |
| 0 678 483 | 10/1995 | European Pat. Off. |
| 772 023 | 10/1934 | France. |
| 2 011 563 | 3/1970 | France. |
| 2 431 465 | 2/1985 | France. |
| 0 456 488 | 5/1991 | France. |
| 21 60 953 | 6/1973 | Germany. |
| 39 28 939 | 3/1990 | Germany. |
| 89 14 938 | 3/1990 | Germany. |
| 2 222 466 | 3/1990 | United Kingdom. |
| 2 268 509 | 6/1993 | United Kingdom. |
| WO 95 29882 | 11/1995 | WIPO. |
| 96 21630 | 7/1996 | WIPO. |
| 96 21631 | 7/1996 | WIPO. |

OTHER PUBLICATIONS

Patent Abstracts of Japan, JP 60 215762, Oct. 29, 1985.
Silikattechnik, vol. 32, No. 10, Oct. 1981, "Plasmaspritzen auf Glass".

*Primary Examiner*—Michael Lusignan
*Attorney, Agent, or Firm*—Oblon, Spivak, McClelland, Maier & Neustadt, P.C.

[57] ABSTRACT

The subject of the invention is a process for depositing, especially continuously, on a glass ribbon (10) of a float line, a reflective layer (3) based on a metal whose melting point is less than or equal to the temperature at which the glass ribbon acquires dimensional stability. The deposition is carried out in a controlled atmosphere, this being inert or reducing, when the glass ribbon (10) has already acquired its dimensional stability, by bringing the surface of the said ribbon into contact with the metal (22) in pulverulent form or in molten form, the temperature of the ribbon during contacting being chosen so that the powder melts and coalesces, or so that the molten metal forms a sheet, at the surface of the ribbon, leaving a solid continuous layer when the temperature of the ribbon is at a temperature of less than or equal to the melting point of the metal.

38 Claims, 2 Drawing Sheets

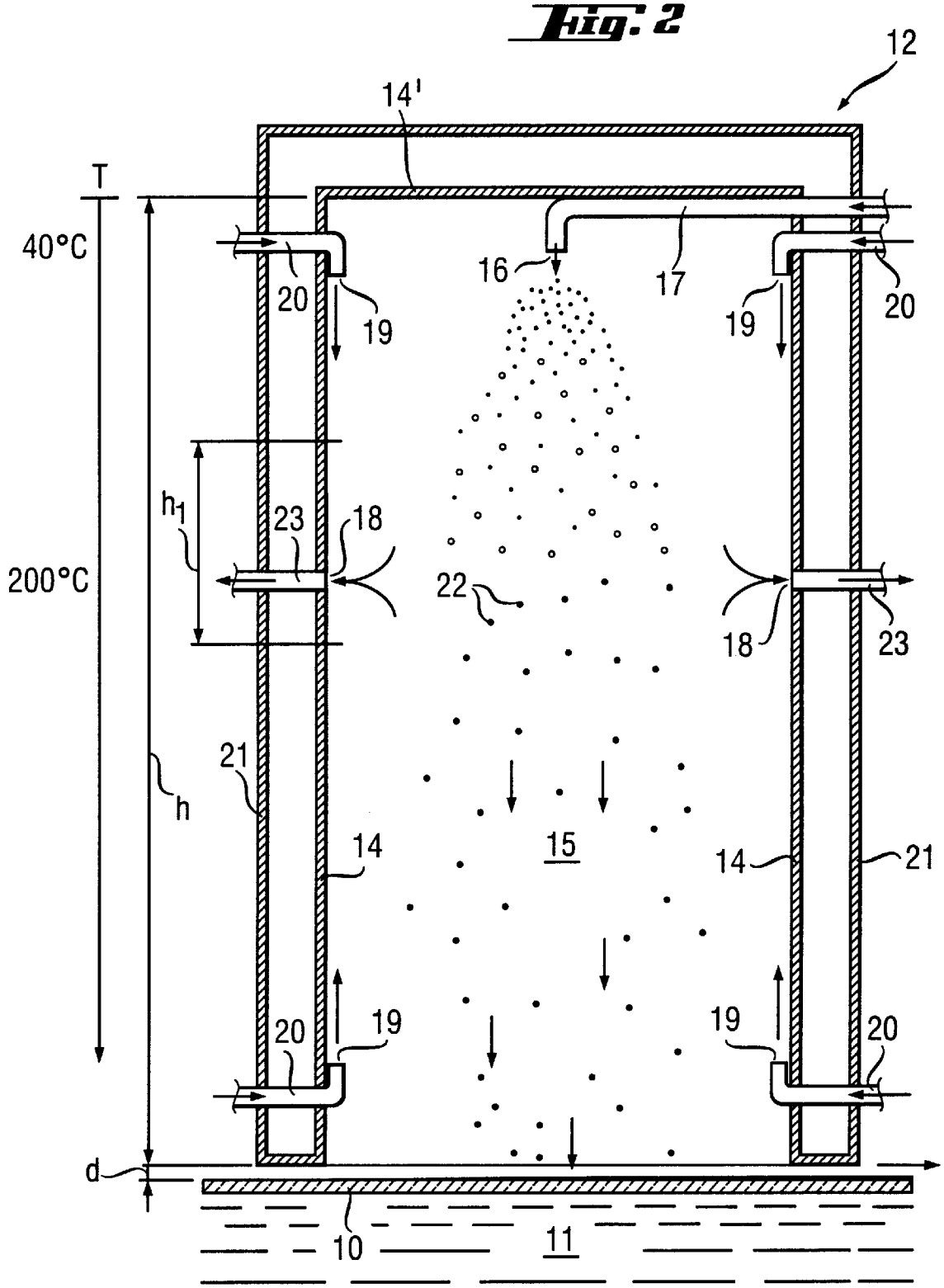

METHOD FOR DEPOSITING A REFLECTIVE LAYER ON GLASS, AND PRODUCTS OBTAINED

The invention relates to the process of depositing a reflective layer, more particularly a metallic layer, on glass.

Depending on its thickness, a metallic layer may in fact impart various properties to a glass substrate intended to become a glazing panel: at relatively low thickness, this metallic layer acts as a coating for protection against solar radiation and/or as a low-emissivity coating. With a greater thickness, it enables a true mirror, having a very high light reflectance, to be obtained.

The most widespread example is silver: it is known to deposit it as a thin film, especially having an interferential thickness, using vacuum techniques of the sputtering type, or as a thicker layer in order to make mirrors, for example using the conventional wet technique of a silvering line. However, silver is a material of limited durability as a thin film when it is exposed to a chemically aggressive medium, and the deposition techniques mentioned above can only be carried out in a subsequent step, discontinuously, on glass plates once they have been cut from the glass ribbon of a float production line.

It is therefore worthwhile considering other metals, which have properties similar to silver but which could possibly be deposited, continuously and less expensively, directly on the glass ribbon of a float line, and which have superior durability, for example aluminium.

It is thus known from Patent FR-2,011,563 to deposit an aluminium layer on a glass ribbon, when it is in the very chamber of the float bath, using a mass of molten metal emitting aluminium vapour towards the glass, the vapour condensing on the surface of the glass ribbon in order to leave a continuous coating. However, this type of technique has drawbacks—it is tricky to implement, it is not easy to ensure a deposition of uniform thickness and, above all, the deposition rate is low, the limiting factor being the very low partial vapour pressure of metallic aluminium.

It is also known, from Patent GB-A-2,248,853, to deposit aluminium layers on a ribbon of float glass at a temperature of at least 100° C. Here, the technique used is one of pyrolysis in the liquid phase, in which organometallic compounds in a solvent are sprayed towards the glass and decompose into elemental metal on coming into contact therewith. This type of pyrolysis is not devoid of drawbacks either—in particular, it requires the discharging and treatment of large quantities of solvents.

The aim of the invention is then to develop a novel process for continuously manufacturing a metallic reflective layer on a ribbon of float glass which palliates the aforementioned drawbacks and which especially makes it possible to obtain layers of high quality compatible with the requirements of the industrial production of glazing panels.

The subject of the invention is a process for depositing, especially continuously, on a glass ribbon of a float line, a reflective layer based on a metal whose melting point is less than or equal to the temperature at which the glass ribbon acquires dimensional stability. It consists in carrying out the deposition in a controlled atmosphere, this being inert or reducing, when the glass ribbon has already acquired this dimensional stability, by bringing the surface of the ribbon into contact with the metal in question in pulverulent form or in molten form, the temperature of the ribbon during contacting being chosen so that the powder melts and coalesces, or so that the molten metal forms a sheet, at the surface of the ribbon, leaving a solid continuous layer when the temperature of the ribbon decreases during the flat-glass forming process down to a temperature of less than or equal to the melting point of the metal.

Within the context of the invention, "metal" is understood to mean a material having an electrical behaviour which is essentially of the conductive type. It is an essentially metallic material, either based on at least two metals, for example in the form of an intermetallic compound, an alloy or a eutectic compound.

Advantageously, the "metal" according to the invention is based on at least one of the materials belonging to the group comprising aluminium, zinc, tin and cadmium. Optionally, it may also comprise silicon or another metal (especially in a concentration of less than 15 at. %).

As preferred non-limiting embodiments of this material, mention may be made of aluminium, aluminiumtin alloys, aluminium-zinc alloys, aluminium-silicon compounds and, especially, the aluminium-silicon eutectic compound comprising 12 at. % of silicon and having a melting point of approximately 575° C.

In addition, "continuous" layer is understood to mean a layer which can be deposited on the glass ribbon so as to cover most, if not all, of its surface. However, this also includes the layers which are deposited, for example, in the form of parallel strips, and which therefore only partially cover, in an intentional and desired manner, the surface of the glass, for example for decorative purposes.

This also includes the layers which appear macroscopically continuous but which, on a microscopic scale, may cover only part of the glass ribbon.

Still within the context of the invention, "surface of the ribbon" is understood to mean not only the surface of the bare glass but also the surface of the glass optionally treated/covered beforehand with at least one given coating.

The invention preferably applies to a glass ribbon of a float line. However, it goes without saying that it is not limited thereto and that it can also apply to a glass ribbon which might not come from a float line or to a non-continuous glass substrate, such as a glass plate.

The process according to the invention has many advantages: on the one hand, within the invention the metal is used only in the solid phase or the liquid phase, and not in the gas phase as in the aforementioned Patent FR-2,011,563. Consequently, the implementation of the process is greatly facilitated since it is easier to control the distribution of a powder or a liquid than a vapour at the surface of the glass. Furthermore, this gets round the problem of the limiting factor consisting of the vapour pressure of the metal, and it is therefore possible to achieve markedly higher deposition rates. This is a key advantage for manufacturing layers having relatively large thicknesses, especially thicknesses sufficient to transform the glass into a mirror. This is because, in deposition operations on a float line in the float-bath chamber, the space in which the deposition may be carried out, knowing that the glass must furthermore already be dimensionally stabilized, is quite small and it is therefore not necessarily possible to "compensate" for the lower deposition rates by longer deposition times or longer metal/glass contacting times.

Moreover, the process according to the invention involves either an operation of melting a metal powder or an operation of "sheeting" a premelted metal on the surface of the glass. There is therefore no pyrolysis in the usual meaning of the term, whether this is in the solid or liquid phase or in the gas phase (in this case, also known by the term CVD or Chemical Vapour Deposition). This is because, on the contrary, pyrolysis involves a chemical reaction step of the decomposition of precursors of the organometallic-derivative type on contact with the hot glass.

This difference has a very positive effect on the properties of the layers obtained. The layers according to the invention have a tendency to be more adherent, denser and less "rough" than pyrolysed layers because of the fact that they arise from the melting of an elemental metal. They also have a tendency to crystallize better since, in the invention, the crystallization takes place during the solidification of the layer at the rate corresponding to the cooling rate of the glass ribbon along its path in the float line. The at least partial crystallization of a pyrolysed layer generally takes place much more "abruptly", during decomposition of the precursors, and is often accompanied by mechanical stresses.

The layers according to the invention also have a tendency to be purer, since there is little risk of impurities being incorporated into the layers during formation, something which is not the case with pyrolysed layers which may, for example, contain a certain amount of residual carbon coming from the decomposition of organic precursors at the glass.

In addition, all these improvements lead to layers having higher quality and greater durability: the denser the layer and the more adherent it is to the glass, the greater is its ability to resist corrosion, especially in a wet medium, or to resist oxidation, this being an advantage if the glass ribbon is subsequently cut into substrates intended to undergo heat treatments, such as a bending operation and/or a tempering operation. A low surface roughness also ensures better corrosion resistance and minimizes any "haze" effect due to a certain amount of diffuse reflection. Finally, greater purity, especially a very low amount of absorbent particles of the carbon type, associated with a relatively high degree of crystallization, gives the layers according to the invention a very high light reflectance, something which is desired above all else in manufacturing mirrors.

The industrial feasibility of the process according to the invention therefore does not work to the detriment of the performance of the reflective layers thus manufactured, quite the contrary.

It is important that the depositions be carried out in an inert or reducing atmosphere, so as to ensure that there is oxidation neither of the metal powder before it comes into contact with the glass ribbon nor of the layer itself while it is being formed. The deposition may be carried out in the float-bath chamber and thus take advantage of its controlled atmosphere, which is a mixture of nitrogen and hydrogen. Alternatively, it is possible to carry out the deposition downstream of the float-bath chamber, especially in an essentially sealed box optionally extending the said chamber. Such an "extension" is described in particular in Patent FR-2,348,894.

Advantageously, the deposition of the reflective layer is carried out when the glass ribbon is at a temperature greater than or equal to the melting point of the metal: this thus ensures that the metal particles reaching the glass do melt and/or that the molten metal is well distributed at its surface.

The metal in pulverulent form may be brought into contact with the surface of the glass in two different embodiments.

The first embodiment consists in spraying the said metal powder in suspension in a carrier gas, this being inert or reducing, in order to prevent it from oxidizing, especially using a distributing nozzle. This may be a static nozzle, which is arranged above the glass and substantially transversely to its running axis, over all or part of the width of the said ribbon. It may also be a moving nozzle, which is given a to-and-fro motion along an axis substantially transverse to the running axis of the glass ribbon. In the case of depositing a layer made of a single metal, for example Al, the powder is made only of particles of the said metal. When the final layer is an alloy, the powder is preferably a mixture of powders of each of the components in the final coating, it being possible to adjust the proportions of the mixture as required, or a powder directly produced from the alloy.

The particle size of the powder or of the mixture of powders (in fact the average diameter of the particles of which it is composed) is advantageously between 0.1 $\mu$m and 100 $\mu$m and especially between 1.0 and 50 micrometres, for example between 5 and 10 micrometres. In such a particle-size range, the powder "particles" will be able to melt and coalesce on the glass in an optimal manner.

The second embodiment consists in generating the metal, in pulverulent form above the glass ribbon, "in situ" from at least one metal derivative, especially a gaseous one, the decomposition of which into a metal is brought about by thermal activation and/or by bringing derivatives capable of reacting together into contact with each other. This is another way of ensuring that the metal, formed in the inert or reducing atmosphere existing above the glass, is not oxidized. Furthermore, starting from raw materials in gas form, it is possible to use the chemical vapour deposition (CVD) technology without having all the aforementioned drawbacks thereof since, within the context of the invention, if there is any decomposition it takes place above the glass and not on contact with it.

The powder thus formed preferably has the same particle size as that mentioned previously.

Preferably, the metal powder is formed "in situ" from a metal derivative (or derivatives) chosen from metal alkyls, metal hydrides or mixed metal hydride/metal alkyl compounds complexed by ammonia or by an amine, especially alanes in the case of aluminium: either a single type of "precursor" is chosen or various types of precursors are chosen, especially when the layer to be obtained is made of an alloy.

Their temperature of decomposition into metal is generally between 50° C. and 600° C., especially between 100° C. and 450° C. It is therefore found that such a temperature range does not coincide with the temperature that the glass ribbon has during deposition of the layer: unlike chemical vapour deposition, there is a decorrelation between the decomposition temperature of the chosen metal derivative and the temperature of the glass at the time of deposition, and there is therefore much more freedom to optimize each of them independently of the other and to select the suitable metal derivative(s).

It is possible, within the invention, to combine with the metal derivative(s) at least one additive which promotes controlled nucleation or growth of the metal particles. This additive helps to adjust the particle size of the powder formed above the glass.

The metal derivatives are therefore introduced above the glass ribbon in gaseous form, advantageously using a device whose walls define a channel for guiding the powder generated. The walls of this cavity are preferably substantially vertical, possibly divergent or, on the contrary convergent towards the glass ribbon, and over at least part of its height a suitable "thermal gradient" is created. By "thermal gradient" is meant a precise control of the temperature which, in a relatively gradual manner is preferably chosen so as to increase towards the glass. Adjusting this temperature gradient gives control of the moment when and the region in the cavity where, on the one hand, the decomposition of the metal derivatives into metal particles takes place and, on the other hand, good growth of the metal particles occurs in order to reach a satisfactory particle size, in particular from 5 to 10 micrometres as in the first embodiment according to the invention.

In a preferred variant, the process consists in injecting the metal derivatives in the upper part of the cavity of the device and in extracting the effluents arising from their decomposition by side evacuation means made in the walls of the cavity, extraction preferably taking place at the level, or near the level, where the metal powder is formed and where it reaches a sufficient particle size. In this way, it is ensured that they are evacuated before they touch the glass or are incorporated by chemical reaction into the metal particles in order to form, for example, a carbide or a nitride of the metal in question, the powder itself "falling" simply under gravity onto the glass. Provision may also be made to inject, at at least one point in the cavity, an inert or reducing gas: this may help to avoid any risk of the metal powder agglomerating on the walls of the cavity.

Moreover, since the cavity is at least partially in the inert and/or reducing atmosphere existing above the glass, it is itself designed so as to be filled with such an atmosphere. If the gaseous metal derivatives are introduced as a suspension in a carrier gas, the latter will of course also be chosen preferably to have an inert and/or reducing nature.

Whether the metal powder is sprayed directly or using metal derivatives, it is necessary to understand in the invention that it liquefies or fuses either in contact with the glass or in the vicinity of the glass, but slightly above it, under the effect of the heat emitted at a short distance by the glass ribbon. The powder can therefore land on the glass in the form of a shower of droplets.

Another possibility according to the invention is to start not with a metal powder or gaseous metal derivatives, but with already molten metal which may be distributed on the surface of the glass using a static distributing nozzle arranged above the glass and transversely to its running axis, which delivers a "curtain" of molten metal onto the glass. Alternatively, it is also possible to use a moving nozzle, given a transverse to-and-fro movement above the glass, of the spray-gun type.

As mentioned previously, the reflective layers according to the invention have two highly advantageous properties:
- on the one hand, they are dense, more so than layers which, for example, would be obtained by pyrolysis or, a fortiori, by vacuum deposition techniques of the sputtering or evaporation type. This density, especially for aluminium layers, is at least 80 and even at least from 90 to 95% of the theoretical density of the said material. Moreover, such a high density enables greater light reflectances to be achieved for a given thickness (it should be noted that these densities may be measured, indirectly, using the electron densities measured by an X-ray reflectometer);
- on the other hand, these layers contain no or very few impurities, carbon-, oxygen- or nitrogen-type impurities having a tendency to increase the absorption and/or transmission of the layer to the detriment of its light reflectance. This low amount of impurities is therefore matched in a high density, in order to achieve a maximum mirror effect for a given thickness. The maximum impurity levels vary slightly depending on which process according to the invention is chosen: if one "starts" from materials, which will make up the layer, in pulverulent or molten form, without involving decomposition of at least partly organic precursors, the layer may be extremely pure. Thus, it generally contains only at most 1 at. % of impurities such as O or C, impurities which possibly become incorporated into the layer while it is being formed, for example by atmospheric pollution or being present in the starting powder. Usually, the amount of impurities is less than 1 at. % and remains below the detectability threshold of the measuring apparatus, in this case a scanning electron microprobe. In contrast, if one starts with precursors in the form of at least partly organic metal derivatives, the reflective layers remain very pure, but possibly with an amount of impurities slightly above that in the previous case, especially at most from 2 to 3 at. %. These may be carbon, oxygen or nitrogen, especially when starting with alane-type compounds.

Whatever the manner in which the metal is brought into contact with the glass, it may be advantageous to treat the surface of the glass before depositing the metallic layer proper. There may be at least two reasons for carrying out such a pretreatment: on the one hand, it may be intended to facilitate wetting/bonding of the layer to the glass. On the other hand, it may also be intended to inhibit a spurious reaction at the glass/metal interface which would tend to form, from the metal and the silicon oxide contained in the glass, the metal oxide corresponding to the metal and silicon.

It may only be a surface "sensitization", consisting in bringing a gaseous product in contact with the glass without there being a true chemical reaction, but with at least partial adsorption of the gas by the surface of the glass. The gas may, for example, be titanium tetrachloride $TiCl_4$.

However, the pretreatment may also comprise depositing at least one so-called "interlayer" prior to the deposition of the layer. The interlayer or interlayers may advantageously be chosen based on at least one of the materials belonging to the following group: silicon, oxides such as silicon oxide, oxycarbide or oxynitride, titanium oxide $TiO_2$, cerium oxide, aluminium oxide $Al_2O_3$, zirconium oxide $ZrO_2$, zinc oxide ZnO, nitrides such as aluminium nitride AlN, silicon nitride $Si_3N_4$, titanium nitride TiN, zirconium nitride, boron oxide, yttrium oxide, magnesium oxide, mixed oxide of Al and of Si, fluorinated aluminium oxide and magnesium fluoride $MgF_2$. It may also involve carbides. Their deposition is preferably carried out by chemical vapour deposition (CVD). This interlayer preferably has a maximum refractive index of 1.8 and a light absorption at most equal to 3%. Its optical thickness may be between 40 and 120 nm and preferably between 70 and 100 nm. The chemical role of this interlayer is therefore the protection of the thin metallic reflective layer, either after production of the mirror, on leaving the float-bath chamber, or later during a subsequent heat treatment of the mirror, or even over time, during the lifetime of the mirror under normal use, for example in a bathroom.

Once the reflective metallic layer has been deposited on the ribbon of float glass, it is recommended to envisage a post-treatment intended to preserve it from oxidation. The most effective way of doing this is to cover it with at least one so-called "additional" layer, especially when the ribbon is still in the inert or reducing atmosphere in which the deposition of the reflective layer was carried out.

The additional layer or layers may in particular be chosen based on a nitride, such as aluminium nitride, silicon nitride or titanium nitride.

However, they may also be based on an oxide (or oxides), especially comprising at least one oxide belonging to the following group: titanium oxide $TiO_2$, tin oxide $SnO_2$, zirconium oxide $ZrO_2$, zinc oxide, niobium oxide, tungsten oxide, antimony oxide, bismuth oxide, tantalum oxide or yttrium oxide, made of aluminium nitride or silicon nitride, or fluorinated tin oxide or made of diamond-like carbon (DLC) aluminium oxide $Al_2O_3$, made of silicon oxide, oxycarbide and/or oxynitride, or vanadium oxide. In the latter case, in order to further limit any contact of the reflective metallic layer with an oxygen-containing compound, provision may be made to deposit between the metallic layer and the oxide layer or layers a "sacrificial" silicon layer which is sufficient to avoid metal/oxide contact but thin enough not to penalize the stacking of layers in terms of light absorption (this comment also applies when an "interlayer" made of pure silicon is chosen: it is advantageous also to limit its thickness to a few nanometres). The depositions of the additional layer(s) are preferably carried out by chemical vapour deposition.

The additional layer covering the reflective metallic layer may have a chemical composition gradient and/or a refractive index gradient through its thickness. This may be an increasing or decreasing index gradient, especially by depositing a material having a low refractive index, (for example lying between 1.45 and 1.60), which, while the layer is being formed, becomes gradually richer in a material having a higher refractive index, especially greater than 2, or vice versa. A chemical composition gradient very advantageously enables two properties to be conferred on a single layer, and to optimize them in parallel without sacrificing one to the benefit of the other, especially as regards the adhesion of the layer to the layer (or layers) with which it is in contact, as well as its mechanical/chemical durability, etc.

This index gradient and/or this chemical composition gradient may be obtained by chemical vapour deposition by using a distributing nozzle having two injection slots, one for each gaseous precursor necessary for obtaining the two, low-index and high-index, materials, and by configuring it so as to cause, along the glass, partial and gradual mixing between the two gas streams emanating from two injection slots.

As the preferred "additional layer having a composition gradient", a layer based on silicon oxide is used which becomes gradually richer in titanium oxide: if a thin layer of "sacrificial" silicon is deposited on the reflective layer, excellent $Si/SiO_2$ or $Si/SiO_xC_y$ adhesion on the reflective layer side is obtained, and the stacking is "completed" by titanium oxide which, if it is well crystallized, exhibits very beneficial anti-fouling and/or anti-misting characteristics, apart from its known photocatalytic properties.

It is also possible to choose to cover the metallic reflective layer with at least one sequence of layers having high and low indices, for example a $SiO_2/TiO_2$ sequence.

Each additional layer preferably has a geometric thickness of at least 10 nm, and especially lying between 20 and 150 nm, in particular between 50 and 120 nm.

More generally, with regard to the nature of the materials making up the "external" complementary interlayers and "internal" additional layers, these are chosen so as to "interfere" optically with the reflective layer as little as possible.

Preferably, they are therefore chosen to be based on a material or a mixture of materials which is (are) transparent in the wavelengths lying within the visible.

They may thus be based on oxide(s), oxycarbide(s) or oxynitride(s) of the elements in Groups IIA, IIIB, IVB, IIIA and IVA and of the lanthanides in the Periodic Table, especially the oxides, oxycarbides or oxynitrides of magnesium Mg, of calcium Ca, of yttrium Y, of titanium Ti, of zirconium Zr, of hafnium Hf, of cerium Ce ($CeO_2$ or $Ce_2O_3$), of aluminium Al, of silicon Si or of tin Sn. As transparent oxides, it is also possible to use doped metal oxides, such as fluorine-doped tin oxide $F:SnO_2$.

Among all these compounds, it is advantageous to choose oxides which have a standard free enthalpy of formation $\Delta G°$ per mole of oxygen at high temperature, especially around 500 to 600° C., which is less than or equal to that of the metal of which the reflective layer is made, referring for example to the diagram mentioning the free enthalpies of formation of oxides as a function of temperature, also known as the Ellingham diagram. Thus, the oxidation of the metal of the reflective layer is thermodynamically not favoured and therefore any risk of oxidation or of deterioration of the reflective layer when hot, during its deposition which, if it is carried out on the ribbon of float glass, actually takes place in the region of from 450 to 700° C., is limited as far as possible.

Thus, when the reflective layer is chosen to be based on aluminium, it is advantageous to choose, as external and/or internal complementary layers, layers based on aluminium oxide, zirconium oxide, magnesium oxide or lanthanum oxide. These oxide layers may especially be deposited using solid-phase or liquid-phase pyrolysis techniques or chemical vapour deposition. If the deposition is carried out in the float-bath chamber, it will more likely be chemical vapour deposition, CVD. Outside the float chamber, CVD, solid-phase pyrolysis or liquid-phase pyrolysis techniques may be used. Thus, it is possible by CVD to deposit layers of oxide such as silicon oxide or silicon oxycarbide from gaseous precursors of the silane and ethylene type, as described in Patent EP-0,518,755. The $TiO_2$ layers may be deposited by CVD from an alkoxide, such as titanium tetraisopropylate, and tin oxide, still by CVD, from butyltin trichloride or dibutyltin diacetate. The aluminium oxide layers may be deposited by liquid-phase pyrolysis or chemical vapour deposition from organometallic precursors such as aluminium acetylacetonate or hexafluoroacetonate.

The transparent complementary layers may also be chosen to be based on a nitride or mixture of nitrides of at least one of the elements in Group IIIA of the Periodic Table, such as aluminium nitride AlN, gallium nitride $GaN_x$ or boron nitride $BN_x$. The AlN layers may be deposited, for example, by CVD, in a known manner, from aluminium alkyl or hydride precursors combined with nitrogen-containing precursors of the ammonia and/or amine type. As the transparent nitride, silicon nitride $Si_3N_4$ may also be used. This is because silicon nitride $Si_3N_4$ is also a very effective material for protecting the reflective layer from oxidation. It may be deposited by CVD from silane and ammonia and/or an amine.

At least one of the complementary layers, and more particularly the external layer, may also be chosen to be based on a transparent material of the diamond or diamond-like carbon (DLC) type, this type of material having a high hardness and thus very effectively protecting the subjacent stack of layers from mechanical abrasion, should this prove necessary (this is also true, to a lesser extent, in respect of titanium oxide).

At least one of the "internal" and "external" complementary layers may also be chosen to be based not on materials which are transparent in the visible but, on the contrary, based on material(s) which absorb to a greater or lesser extent in the visible, this or these materials being different from those which may moreover make up the reflective layer. In order that they do not interfere optically, or not to all intents and purposes, as is the case with the transparent materials listed above, it is then preferable to confine complementary layers of this type to small thicknesses, especially less than or equal to 10 nm, especially about 1 to 8 nm. Nitrides of a transition metal, such as the nitride of tungsten W, of zirconium Zr, of hafnium Hf, of niobium Nb and of titanium Ti, or else carbon nitride, may be used. Semiconductor materials, such as silicon, may also be used.

In this case, the materials are chosen depending on their affinity with respect to glass and/or on the material of the reflective layer and on their chemical inertness with respect to the latter. Thus, it may be beneficial to choose a thin internal layer of Si when the reflective layer is made of metal, this material being an effective barrier to the diffusion of alkalis and of oxygen coming from the glass, and also being able to act as a glass/metal adhesion promoter. The silicon may be deposited by CVD from $SiH_4$.

At least one of the complementary layers may also have a chemical composition gradient through its thickness, thereby very advantageously enabling two properties to be conferred on a single layer.

This may be thus an "internal" complementary layer based on $SiO_2$ or $SiO_xC_y$ becoming gradually richer in silicon, or based on $SiO_2$ or $SiO_xC_y$ becoming gradually richer in the oxide of the metal of the reflective layer, such as $Al_2O_3$ if the reflective layer is made of aluminium. The role of promoting adhesion and of reducing mechanical stresses in the internal layer, with an improved affinity of the latter both at its interface with the glass and at its interface with the reflective layer, are thus optimized.

The external complementary layer may also have a chemical composition gradient, based on an oxide of the metal of the reflective layer such as $Al_2O_3$, or based on $SiO_xC_y$, becoming gradually richer in titanium oxide, the $Al_2O_3$-type oxide having a good affinity and a high chemical inertness with respect to aluminium when it is this type of material which makes up the reflective layer, the $TiO_2$ itself being able to improve the mechanical durability of the stack and possibly to confer on it beneficial anti-misting/anti-fouling properties, as described in Patent FR95/10839 filed on Sep. 15, 1995.

These chemical composition gradients may be obtained by chemical vapour deposition, by using a distribution nozzle having two injection slots, one for each gaseous precursor necessary for obtaining the two materials, and by configuring it so as to cause, along the glass, partial and gradual mixing between the two gas streams emanating from two injection slots, as described, for example, in Patent PCT/FR96/01073 filed on Jul. 10, 1996.

The internal and external complementary layers generally have geometric thicknesses of between 1 and 200 nm, especially between 30 and 160 nm if they are transparent and between 1 and 5 nm if they are absorbent.

In fact, the thicknesses of the complementary layers are to be modulated depending on many parameters, including the very nature of these layers, that of the reflective layer and the type of attack to which the stack of layers will be exposed. Thus, it is preferable that the reflective layer be chemically "isolated", using both an internal complementary layer and an external complementary layer, in order to preserve its properties during its hot deposition. Furthermore, if the glass substrate has thereafter to undergo heat treatments of the annealing, bending or tempering type, these layers will fulfill their protection role once again, and in the latter case it may be advantageous to make them thicker than in the case where the substrate does not have to undergo this type of postdeposition treatment.

Embodiments of the stack of layers according to the invention may be as follows:

TiN or AlN/Al/AlN
AlN/Al/$SiO_xC_y$
Al/$SiO_xC_y$
$SiO_xC_y$/Al/$SiO_xC_y$
Si/Al/$SiO_xC_y$
$Al_2O_3$/Al/$Al_2O_3$

The invention also specifies the application of a glass substrate, such as that described previously and the external layer of which is made of $TiO_2$ (or ends up as $TiO_2$ in the case of a layer having a composition gradient), to the production of an anti-fouling and/or anti-misting mirror or glazing panel; the same applies to the application of this substrate, the external complementary layer of which is harder than the reflective layer and especially based on diamond or on diamond-like carbon, to the production of anti-abrasion mirrors.

It is also intended for the glass substrate of the invention to be applied to the production of a heated window, which heats by means of a current passing through the reflective layer of suitable thickness.

The subject of the invention is also all the products obtained, especially those obtained after cutting up the ribbon of float glass, preferably using the process defined previously, or by any other process making it possible to obtain similar characteristics, especially in terms of density and low level (or indeed zero or virtually zero levels) of impurities, especially in the reflective layers.

Two applications are particularly intended: in the first place, these products are intended to be used as glazing panels, both for buildings and for motor vehicles, the metal reflective layer, especially made of aluminium, giving these glazing panels a solar protection function. In this case, the thickness of the reflective layer is usually limited to at most 30 nm so as to maintain a sufficient level of light transmission.

In the second place, they may be used as mirrors. In this case, it is necessary to achieve a very high light reflectance and this time it is therefore preferable to use metal layers having a thickness of at least 30 nm.

More generally, the glass substrate coated according to the invention has very diverse applications and can be used in reflecting or semi-reflecting mirrors, including bottom mirrors in photovoltaic cells, bottom mirrors in basins and mirrors in photocopiers, solar-protection glazing panels for buildings or any vehicle (of the low-emissivity or anti-solar type), anti-electromagnetic-radiation (radar waves or radio waves) windows, rear-view mirrors, glass-based furnishing elements, the walls of a container of aquarium or swimming-pool type, as internal partitions, and decorative glass. The substrate according to the invention may also be used by employing the reflective layer as a conducting electrode, for example in electrochemically active glazing panels, such as electrochromic or "viologenic" glazing panels, liquid-crystal or optical-valve glazing panels.

The invention also relates to the process for manufacturing the stack of layers with which the glass substrate is coated, especially by hot deposition of the reflective layer from molten metal powder according to the "D.P.M." process mentioned previously. The complementary layer or layers are preferably deposited by chemical vapour deposition or by liquid- or solid-phase pyrolytic deposition.

The preferred method of manufacture consists in depositing all the layers hot, on the ribbon of a float glass, by preferaby depositing at least the first two layers in the float-bath chamber. Thus, the depositions are carried out continuously, making a significant saving in terms of time and of production costs compared to techniques in which the deposition is carried out in a subsequent step, of the type including sputtering, sol-gel or immersion in a silvering bath, with, in addition, the solidity and substrate adhesion which are characteristic of layers deposited at high temperature.

One embodiment example of products according to the invention may also be a glass substrate, whether a mirror or a glazing panel, which contains the sequence:

aluminium/aluminium nitride, or else
aluminium/silicon/oxide, or
aluminium/aluminium nitride.

BRIEF DESCRIPTION OF THE DRAWING

Other details and advantageous characteristics emerge from the description below of non-limiting embodiment examples, with the aid of the following figures:

FIG. 2: a cross-section of that portion of the float-glass chamber in which the deposition of the metallic reflective layer according to the invention is carried out.

It should be pointed out that both FIG. 1 and FIG. 2 are high diagrammatic representations which do not scrupulously respect the proportions, so as to make them easier to understand.

Figure 1:
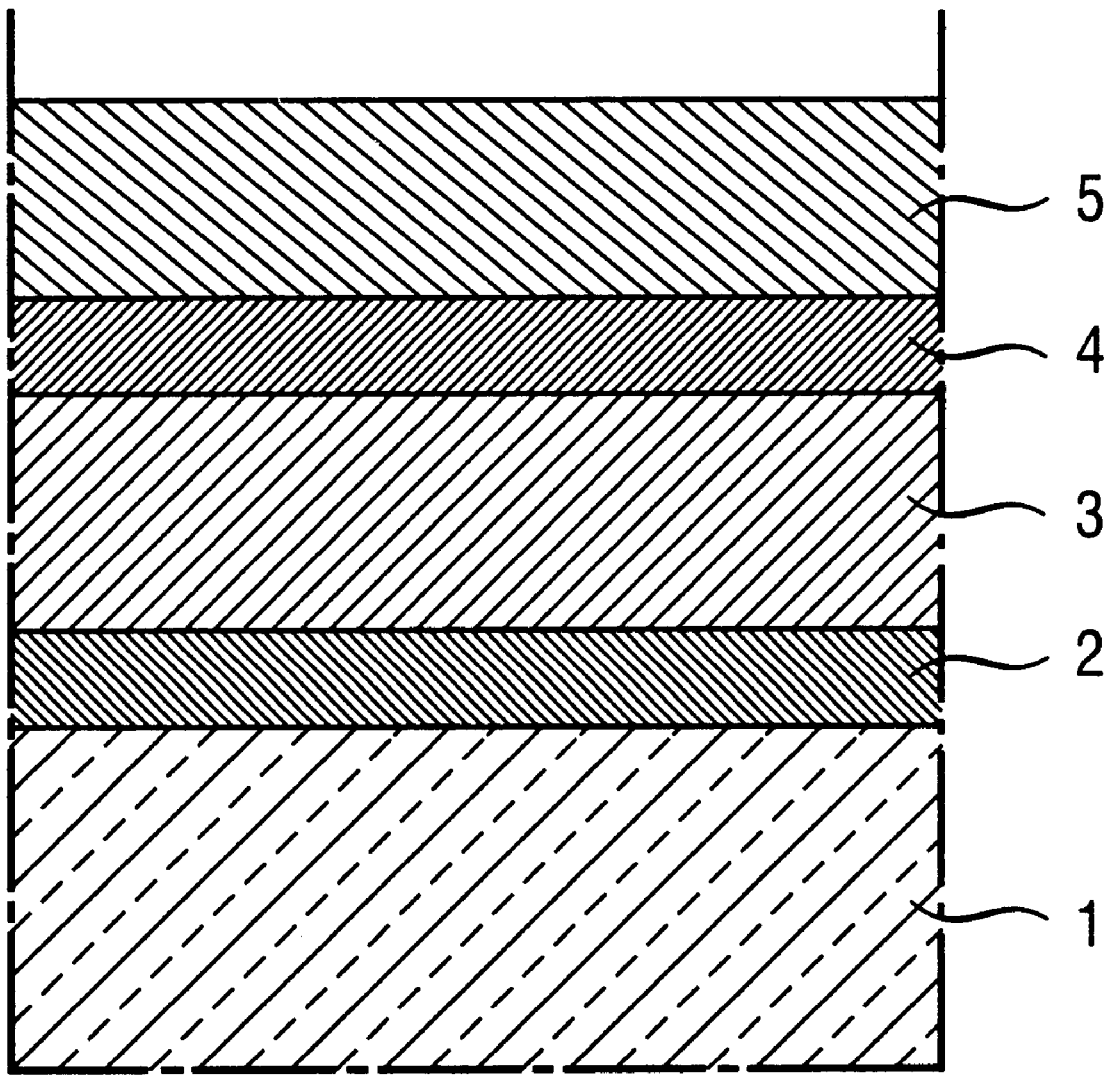
FIG. 1: a cross-section of a glass substrate coated according to the invention.

The following examples were produced on a ribbon of float glass 4 mm in thickness, being a clear soda-lime silica glass which, once cut up, is marketed by the company SAINT-GOBAIN VITRAGE under the name Planilux.

It could quite equally well be an extra-clear glass or a glass which is tinted throughout, such as the glass products which, once cut up, are marketed by the company SAINT-GOBAIN VITRAGE respectively under the name Diamant and under the name Parsol.

After cutting, glass substrates are obtained, as shown in FIG. 1, which are provided with a stack of layers in the following manner: the substrate 1 is coated with an optional first layer 2, called interlayer, made of silicon, this interlayer itself being covered by the metal reflective layer 3. The latter is covered by an additional optional layer 4, once again based on silicon, on which a second additional layer 5 is deposited.

In all the examples, the reflective layer 3 is made of aluminium and is deposited on the glass ribbon by a process explained with the help of FIG. 2.

The portion of the glass ribbon 10, as shown in this figure, lies within the float-bath chamber: the ribbon 10 floats on the surface of a molten tin bath 11 inside a chamber, not shown, containing the tin bath and filled with a controlled atmosphere composed of a mixture of nitrogen and hydrogen. The glass runs over the tin bath 11 from a glass-melting furnace, not shown, lying to the left of FIG. 2, and spreads out thereon in order to form a ribbon which is extracted from the bath at a constant rate in the direction of the arrow by extraction means mounted on the exit side of the bath, on the right-hand side of the figure.

Mounted above the ribbon 10, which has a width of approximately 3.30 metres, in a region of the float bath where the glass has acquired its dimensional stability, is a device 12 arranged entirely inside the float-bath chamber. This device is in the form of a gas-distributing nozzle, above the glass ribbon 10, and is arranged transversely to its running axis and over its entire width. The device 12 defines a cavity 15 of approximately parallelepipedal shape by means of side internal walls 14 and an upper internal wall 14', the walls 14 of which, transverse to the glass axis, are substantially vertical or slightly convergent or divergent towards the glass. These walls end, at the lower part, very close to the surface of the glass, for example at a distance d of less than 20 millimetres from the surface of the glass. Various openings are made in these walls:

openings in the upper wall 14' and/or in the side walls 14, providing passage for the $N_2/H_2$ gas mixture in the float-bath chamber inside the cavity 15;

a plurality of openings 16 made in the upper wall 14' or in the upper part of the walls 14, arranged in line uniformly over the entire width of the cavity 15, in the manner of injectors, into which emerge inlet pipes 17 connected to means for feeding a gas mixture x, these means not being shown;

a plurality of openings 18 made in at least one of the transverse side walls 14, especially approximately one quarter or ¾ of the way up the said walls, into which emerge gas evacuation pipes connected to extraction means, these not being shown;

a plurality of openings 19 made in at least one of the side walls of the cavity 15, especially in the first third of the height of the cavity, into which emerge gas inlet pipes 20 connected to means for supplying an $N_2/H_2$ mixture, not shown, this mixture being similar or identical to that existing in the float chamber.

Arranged in the thickness of the internal walls 14, 14' and external walls 21 of the device 12 are means capable of controlling and regulating the temperature of the cavity 15 over its entire height h, especially lagging/heating means combined with cooling means, the operation of which is linked to measurements of the temperature inside the cavity, these measurements being made regularly by suitable sensors: a temperature profile over the entire height h of the cavity is created, either by manual adjustments of the said lagging/cooling means or by electronic/computer-based automatic control, so as to have a temperature gradient increasing towards the glass ribbon 10, which starts at approximately 30 to 100° C. in the upper part near the openings 16 up to more than 600° C. near the glass.

The device 12 operates in the following manner: vapour from an aluminium derivative in suspension in an inert gas such as nitrogen (this is the mixture x mentioned above) is continuously injected via the openings 16. This derivative may be especially Al $(CH_3)_3$, Al $(C_2H_5)_3$, $AlH_3$ $(NH_3)$ or $AlH_3$ (amine). Here it is more specifically dimethylmonoethylamine alane, a hydride stabilized by an amine, decomposing into metallic aluminium at approximately 180 to 200° C., and the formula of which is $AlH_3(N(C_2H_5)(CH_3)_2)$.

In the injection region in the cavity, the temperature is approximately 40° C., the mixture x is sprayed into the cavity substantially perpendicularly to the plane defined by the glass ribbon 10. Since the temperature in the cavity increases gradually on moving closer to the glass, the alane decomposes to form pulverulent aluminium 22 in a region $h_1$ in the cavity 15 where it reaches its decomposition temperature, this region being located approximately in the upper half of the cavity; the aluminium particles are then driven, simply under gravity, into contact with the glass, while the effluents coming from the decomposition of the alane are extracted via the openings 18, in this powder-forming region $h_1$. The parameters of the alane decomposition reaction are adjusted, especially in order to obtain a powder of particles of sufficiently large diameter so that it is possible to extract the effluents without driving the powder 22 formed into the extraction pipes and also so as to avoid the effluents reacting at higher temperature with the aluminium particles according to an undesired chemical mechanism.

The powder "reaches" the glass ribbon while the latter is at a temperature of from 660 to 700° C., especially approximately 680° C., that is to say at a temperature which lies between the maximum temperature at which the glass is dimensionally stable (700–750° C.) and the melting point of aluminium (approximately 650–660° C.). The aluminium particles in contact with the glass melt instantaneously and the droplets coalesce in order to leave a continuous film of molten aluminium which gradually solidifies as the temperature of the glass decreases so as to fall below the melting point of aluminium.

The final thickness of the aluminium layer thus deposited may be modulated as required by adjusting various deposition parameters, especially the alane concentration in the gas mixture x, the flow rate of the said mixture, etc.

Moreover, the $H_2/N_2$ gas mixture is injected via the openings 19 so that the mixture is sprayed towards the top of the cavity 15, especially in a manner approximately tangential to the side walls 14: in this way, the build-up of aluminium powder along its walls is avoided, and therefore the fouling of the cavity 15 is slowed down, and any risk of a sudden fall of agglomerated particles onto a point on the ribbon, which may impair the quality of the coating, is prevented.

Referring to the diagram in FIG. 1, the aluminium layer 3 is therefore deposited using the device 12 which has just been described. Prior to this deposition, a thin layer 2 of pure silicon is deposited by CVD, in a known way, from silane, for example as described in French Patent FR-2,382,511, using a nozzle arranged just upsteam of the device 12, when the glass ribbon has already acquired its dimensional stability, that is to say when it is approximately at 700° C.

Before the glass ribbon provided with the silicon interlayer 2 and with the aluminium reflective layer 3 leaves the float-bath chamber, one or more additional layers are deposited, the sequences of which will be given in detail in the following examples. These are aluminium nitride layers which are deposited by CVD, in a known manner, from aluminium alkyl or hydride precursors with ammonia or an amine, and/or layers of an oxide such as silicon oxide or silicon oxycarbide, which are deposited in a known manner by CVD from silane and ethylene, as is described in Patent EP-0,518,755, or else of tin oxide deposited by CVD in a known manner from gaseous precursors, such as butyltin trichloride or dibutyltin diacetate, or else of titanium oxide deposited by CVD in a known manner from gaseous precursors such as a titanium alkoxide of the titanium-tetraisopropylate type.

It may be noted that instead of, or in combination with, the $SnO_2$ or $TiO_2$ oxide layer, it is possible just as well to use silicon oxide layers deposited by CVD from gaseous precursors such as tetraethoxysilane. It would also be possible to use aluminium oxide layers deposited by CVD from gaseous precursors such as aluminium acetylacetonate or hexafluoroacetonate. A vanadium oxide layer may also be chosen, which may be deposited by CVD from gaseous precursors of the vanadium-alkoxide type such as vanadium tetraethylate, or of the halide type such as $Vcl_5$, or of the oxychloride type such as $VOCl_3$.

Instead of, or in combination with, the aluminium nitride layer, it is also possible to use a silicon nitride layer which may be obtained by CVD from a gas mixture containing a silane and ammonia and/or an amine.

In the case where it is intended to deposit an oxide layer 5 and not a nitride layer above the aluminium layer 3, a thin silicon layer 3, deposited by CVD like the layer 1 previously mentioned, is inserted.

All the depositions are therefore, in the following examples, carried out in the float chamber, that is to say in a strictly non-oxidizing atmosphere and when the glass is at a temperature falling in stages between approximately 750 and 700° C. for the deposition of the first silicon layer and at at least 580–590° C. for the deposition of the final layer of the stack, the glass ribbon usually "leaving" the float-bath chamber at a temperature of approximately 580° C.

EXAMPLE 1

Using the techniques explained in detail above, the sequence of the following layers is deposited on the surface of the glass ribbon 10 (the geometrical thicknesses are specified under each of the layers, expressed in nanometres):

| glass$^{(1)}$ | / | Al$^{(3)}$ | / | AlN$^{(5)}$ |
|---|---|---|---|---|
|  |  | 50 nm |  | 130 nm |

EXAMPLE 2

The sequence is as follows:

| glass$^{(1)}$ | / | Al$^{(3)}$ | / | (AlN/TiO$_2$)$^{(5)}$ | |
|---|---|---|---|---|---|
|  |  | 50 nm |  | 60 nm | 50 nm |

EXAMPLE 3

| glass$^{(1)}$ | / | Si$^{(2)}$ | / | Al$^{(3)}$ | / | Si$^{(4)}$ | / | (SiO$_x$C$_y$/TiO$_2$)$^{(5)}$ | |
|---|---|---|---|---|---|---|---|---|---|
|  |  | 2 nm |  | 50 nm |  | 4 nm |  | 70 nm | 60 nm |

The index of the $SiO_xC_y$ layer is set here to approximately 1.55.

EXAMPLE 4

This time the sequence is as follows:

| glass$^{(1)}$ | / | Al$^{(3)}$ | / | (AlN/TiO$_2$)$^{(5)}$ | |
|---|---|---|---|---|---|
|  |  | 50 nm |  | 60 nm | 50 nm |

The index of aluminium nitride is approximately 1.85.

EXAMPLE 5

The sequence is as follows:

| glass$^{(1)}$ | / | Al$^{(3)}$ | / | Si$^{(4)}$ | / | SnO$_2$$^{(5)}$ |
|---|---|---|---|---|---|---|
|  |  | 50 nm |  | 4 nm |  | 120 nm |

EXAMPLE 6

The sequence is as follows:

| glass$^{(1)}$ / | Al$^{(3)}$ | / | Si$^{(4)}$ | / | (SiO$_2$/TiO$_2$ gradient layer) $^{(5)}$ |
|---|---|---|---|---|---|
| | 60 nm | | 5 nm | | 120 nm |

The SiO$_2$/TiO$_2$ gradient layer is a layer obtained by CVD and has a composition containing at least 80% by weight of SiO$_2$ at the interface with the subjacent silicon layer (4) and up to at least 80% by weight of TiO$_2$ at the interface with the air. It is obtained according to the technique explained in Patent Application FR-95/08421 of Jul. 12, 1995, especially in its Example 9, from the silicon oxide and titanium oxide precursors mentioned previously.

Next, the glass ribbon in each of these 6 examples is cut up and then on each of the 6 glass plates the light reflectance $R_L$ as a percentage according to the $D_{65}$ illuminant is measured. The following results are obtained:

| EXAMPLE | $R_L$ |
|---|---|
| Example 1 | 92% |
| Example 2 | 92% |
| Example 3 | 96% |
| Example 4 | 95% |
| Example 5 | 92% |
| Example 6 | 95% |

In conclusion, each of these 6 plates may advantageously be used as so-called "face 1" mirrors, that is to say mirrors where the observer looks at the glass substrate on the side where it is provided with the reflective layer 3.

It goes without saying that by suitably adapting the sequence of a so-called interlayer 2 and/or additional layers 4, 5, the invention also makes it possible to manufacture so-called "face 2" mirrors, that is to say mirrors in which the observer looks at the substrate on the side opposite that provided with the reflective layer.

Moreover, the substrates provided with aluminium layers 3 thus manufactured, but a little thinner, for example from about 10 to 20 nm, may be used as solar protection glazing panels very satisfactorily.

However, it may be seen that it is important to protect as far as possible the aluminium layer from the risks of oxidation both on line, as soon as it leaves the float-bath chamber, and to preserve it during oxidizing heat treatments of the bending or tempering type. The additional layers 5 according to the invention achieve this effectively. The silicon interlayer 2 is optional; it facilitates the adhesion of the aluminium to the glass and inhibits the reaction which tends to produce alumina at the glass/aluminium interface. However, it may be omitted or replaced by a gas treatment, for example by passing TiCl$_4$ over the surface of the glass just before deposition of the aluminium layer.

The silicon layer 4 above the aluminium is also optional; it makes it possible to guarantee that the aluminium layer does not oxidize during deposition of the next oxide layer.

For optical reasons, especially in order to increase the light reflectance, it is also possible to deposit additional layers, especially oxide layers, on the other face of the glass ribbon, for example in a subsequent step.

The invention has therefore developed the continuous manufacture of mirrors or of solar-protection glazing panels, on the float line, which manufacture is highly advantageous in terms of both yield and cost. The aluminium layer thus deposited is of high quality and is especially very dense, very pure and particularly adherent to the glass (or to the layer which is subjacent to it).

We claim:

1. A process, comprising:
   depositing a metallic reflective layer on a surface of a ribbon of float glass by contacting the surface of the float glass with a pulverulent metal or molten metal in an inert or reducing atmosphere, wherein
   the metal has a melting point that is less than or equal to the temperature at which the ribbon acquires dimensional stability, and wherein
   the ribbon temperature during the contacting is such that the pulverulent metal melts and coalesces at the surface of the ribbon or the molten metal forms a sheet at the surface of the ribbon to provide a solid continuous metallic reflecting layer when the ribbon temperature is less than or equal to the melting point of the metal.

2. Process according to claim 1, characterized in that the "metal" is based on a single metal, or based on an intermetallic compound, a metal alloy or a eutectic compound.

3. Process according to claim 1 or claim 2, characterized in that the "metal" is based on at least one of the metals belonging to the group comprising aluminium, zinc, tin, cadmium and, optionally, comprises silicon.

4. Process according to one of the preceding claims, characterized in that the deposition is carried out in the float-bath chamber.

5. Process according to claim 1, characterized in that the deposition is carried out downstream of the float-bath chamber, especially in an essentially sealed box optionally extending the said chamber.

6. Process according to one of the preceding claims, characterized in that the deposition is carried out when the glass is at a temperature greater than or equal to the melting point of the metal.

7. Process according to claim 6, characterized in that the contacting of the metal in pulverulent form with the surface of the glass takes place by spraying a powder in suspension in a carrier gas, this being inert or reducing, especially using a distribution nozzle arranged above the glass ribbon and transversely to its running axis, and capable of distributing the powder over the entire width of the ribbon.

8. Process according to claim 7, characterized in that a powder particle size of between 0.1 and 100 μm, especially between 1.0 and 50 μm, is chosen.

9. Process according to claim 4, characterized in that the metal is generated in pulverulent form (22) above the glass ribbon, from metal derivatives, especially gaseous ones, the decomposition of which into metal is brought about by thermal activation and/or bringing them into contact with each other.

10. Process according to claim 9, characterized in that the derivatives are chosen from metal alkyls, metal hydrides, mixed metal hydride/metal alkyl compounds complexed by ammonia or by a primary, secondary or tertiary amine.

11. Process according to claim 9 or 10, characterized in that the derivatives decompose into metal at a temperature of between 50° C. and 600° C., especially between 100° C. and 450° C.

12. Process according to one of claims 9 to 11, characterized in that at least one additive which promotes nucleation or growth of the metal particles is associated with the metal derivative(s).

13. Process according to one of claims 9 to 12, characterized in that the metal derivative(s) are introduced above the glass ribbon (10) in gaseous form using a device (12) comprising a cavity (15) whose walls (14, 14') define a channel for guiding the powder (22) generated by the said derivatives towards the glass ribbon (10).

14. Process according to claim 13, characterized in that the walls (14) of the cavity (15) are substantially vertical, possibly convergent or divergent towards the glass ribbon (10), and in that a thermal gradient is created over at least part of the height (h) of the said cavity.

15. Process according to either of claims 13 and 14, characterized in that the metal derivative(s) are injected in the upper part (16) of the cavity (15) and in that the effluents arising from the decomposition of the derivatives are extracted by side evacuation means (23) made in the walls (14) of the said cavity (15), preferably at the level, or near the level, where the metal powder is formed and where it reaches a sufficient particle size.

16. Process according to one of claims 13 to 15, characterized in that an inert or reducing gas is injected at at least one point (19) in the cavity (15).

17. Process according to one of claims 7 to 16, characterized in that the metal powder liquefies on the glass ribbon (10) or in the vicinity of it.

18. Process according to claim 1, characterized in that the molten metal is sprayed towards the glass ribbon, especially using a static distributing nozzle delivering a curtain of molten metal above the ribbon and transversely to its running axis, or using a moving nozzle, given a to-and-fro movement transverse to the running axis of the ribbon.

19. Process according to one of the preceding claims, characterized in that the surface of the glass ribbon is treated before depositing the metal-based reflective layer (3), especially by a contacting/adsorption of vapour of the $TiCl_4$ type, or by depositing at least one interlayer, especially made of silicon Si, made of an oxide such as aluminium oxide $Al_2O_3$, silicon oxide, oxynitride or oxycarbide, $SiO_2$, SiON or SiOC, zirconium oxide $ZrO_2$, cerium oxide, titanium oxide $TiO_2$, zinc oxide ZnO, or boron oxide, yttrium oxide, magnesium oxide, or a mixed oxide of Al and of Si, made of fluorinated aluminium oxide, of magnesium fluoride or of a nitride such as aluminium nitride AlN, silicon nitride $Si_3N_4$, titanium nitride, zirconium nitride, or a carbide, which layer is deposited, for example, by chemical vapour deposition.

20. Process according to one of the preceding claims, characterized in that the metal-based reflective layer (3) is covered with at least one additional layer (5) intended to protect it from oxidation, especially when the glass ribbon is still in the inert and/or reducing controlled atmosphere in which the deposition of the said reflective layer was carried out.

21. Process according to claim 19, characterized in that the additional layer(s) chosen is (are) based on a nitride, such as aluminium nitride, silicon nitride or titanium nitride.

22. Process according to claim 19 or 20, characterized in that the additional layer(s) chosen, optionally deposited on a thin silicon "sacrificial" layer (4), is (are) based on an oxide(s) comprising at least one oxide of the following group: titanium oxide $TiO_2$, tin oxide $SnO_2$, zirconium oxide $ZrO_2$, silicon oxide, oxycarbide and/or oxynitride $SiO_2$, SiOC or SiON, aluminium oxide $Al_2O_3$, vanadium oxide, zinc oxide, niobium oxide, tungsten oxide, antimony oxide, bismuth oxide, tantalum oxide or yttrium oxide, made of aluminium nitride or silicon nitride, or of fluorinated tin oxide or made of carbon-like diamond.

23. Process according to claim 19 or 20, characterized in that the reflective layer (3) is covered with an additional layer (5) having a composition gradient or a refractive index gradient through its thickness, especially by depositing a material such as silicon oxide, which becomes gradually richer in a material such as titanium oxide.

24. Process according to claims 19, characterized in that the reflective layer (3) is covered with at least one sequence of low-index and high-index layers, for example a $SiO_2$/$TiO_2$ sequence.

25. Process according to one of the preceding claims, characterized in that the glass ribbon of a float line is substituted either by a glass ribbon not coming from a float line or a non-continuous glass substrate, such as a glass plate.

26. Glazing panel (1) obtained by cutting up the float-glass ribbon (10) covered according to the process in accordance with one of the preceding claims, characterized in that it is provided with an aluminium reflective layer (3) having a thickness less than or equal to 30 nm, depending on the solar protection.

27. Mirror (1) obtained by cutting up the float ribbon (10) covered according to the process in accordance with one of the preceding claims, characterized in that it is provided with an aluminium reflective layer (3) having a thickness greater than or equal to 30 nm.

28. Glazing panel (1) according to claim 26 or mirror according to claim 26, characterized in that it is provided with the aluminium/SiOC or aluminium/AlN or aluminium/TiN or aluminium/Si/oxide sequence.

29. Glass substrate provided with at least one reflective layer (3) based on a metal of the intermetallic-compound, alloy or eutectic compound type, especially based on at least one of the metals belonging to the group comprising aluminium, zinc, tin and cadmium and, optionally, also comprising silicon, characterized in that the substrate (1) is also provided with an "external" complementary layer (4) and/or with an internal complementary layer (2), with respect to the said reflective layer (3), the complementary layer(s) being intended to ensure its chemical and/or mechanical durability.

30. Glass substrate (1) according to claim 29, characterized in that the "internal" complementary layer (2) and/or the "external" complementary layer (4) are based on material(s) which is(are) transparent in the wavelengths lying within the visible and of the oxide(s) type chosen from at least one of the compounds comprising the oxides, oxycarbides or oxynitrides of the elements in Group IIA, IIIB, IVB, IIIA and IVA and of the lanthanides in the Periodic Table, such as the oxides of Mg, Ca, Y, Ti, Zr, Hf, Ce, Al, Si, Sn, or else based on transparent doped metal oxides such as $F:SnO_2$.

31. Glass substrate (1) according to either of claims 29 and 30, characterized in that the "internal" complementary layer (2) and/or the "external" complementary layer (4) are based on material(s) which is(are) transparent in the wavelengths lying within the visible and of the nitride(s) type, especially based on a nitride of at least one of the elements in Group IIIA in the Periodic Table, such as the nitride of Al, of Ga or of boron, or else based on silicon nitride.

32. Glass substrate (1) according to claim 28, characterized in that the "internal" complementary layer (2) and/or the "external" complementary layer (4) are based on material(s) which is(are) transparent within the wavelengths lying within the visible and of the carbon-like-diamond type.

33. Glass substrate (1) according to claim 29, characterized in that the "internal" complementary layer (2) and/or the "external" complementary layer (4) are based on material(s) which is(are) absorbent in wavelengths lying within the visible and are different from those of which the reflective layer (3) is composed, of the transition-metal nitride type, such as the nitride of W, of Zr, of Hf, of Nb or of Ti, or carbon nitride, or else made of silicon Si, these preferably being confined to geometric thicknesses of less than or equal to 10 nm, especially of about 1 to 8 nm.

34. Glass substrate (1) according to claim 29, characterized in that the "internal" complementary layer (2) and/or the "external" complementary layer (4) has a chemical composition gradient through its thickness, especially an "internal" complementary layer (2) based on $SiO_2$ or $SIO_xC_y$ becoming gradually richer in silicon, or based on $SiO_2$ or $SiO_xC_y$ becoming gradually richer in $Al_2O_3$, and/or an "external" complementary layer (4) based on $Al_2O_3$ or $SiO_xC_y$ or $SiO_2$ becoming gradually richer in $TiO_2$, or based on Si becoming gradually richer in $SiO_xC_y$ or in $SiO_2$.

35. Glass substrate (1) according to claim 29, characterized in that the geometric thickness of the "internal" complementary layer (2) and the "external" complementary layer (4) is between 1 and 200 nm, especially between 30 and 160 nm.

36. Glass substrate (1) according to one of claims 29 to 35, characterized in that the reflective layer (3) lies between an "internal" complementary layer (2) and an "external" complementary layer (4), the nature and thickness of which are chosen so as to preserve the properties of the reflective layer (3) during its hot deposition and, optionally subsequently in the case where the glass substrate (1) is intended to undergo, after deposition of the layers, a heat post-treatment of the annealing, bending or tempering type.

37. Glass substrate according to one of claims 29 to 36, characterized in that the reflective layer (3) has a density at least than 80 and especially of at least 90 or 95% of its theoretical density.

38. Glass substrate according to one of claims 29 to 37, characterized in that the reflective layer (3) has a level of impurities, especially C, N, O, of at most 3 at. %, especially of at most 1 at. %.

* * * * *